United States Patent [19]
Takekawa

[11] Patent Number: 5,727,148
[45] Date of Patent: Mar. 10, 1998

[54] MESSAGE CONTROL METHOD AND SYSTEM

[75] Inventor: Ikuo Takekawa, Kawasaki, Japan

[73] Assignee: Fujitsu Limited, Kawasaki, Japan

[21] Appl. No.: 698,762

[22] Filed: Aug. 16, 1996

Related U.S. Application Data

[63] Continuation of Ser. No. 123,257, Sep. 20, 1993, abandoned.

[30] Foreign Application Priority Data

Nov. 25, 1992 [JP] Japan ................... 4-315392

[51] Int. Cl.$^6$ ................................................. G06F 13/42
[52] U.S. Cl. ........................... 395/200.04; 395/200.13; 395/330
[58] Field of Search .................. 395/200.13, 200.03, 395/200.04, 200.01, 330; 364/514 A, DIG. 1

[56] References Cited

U.S. PATENT DOCUMENTS

| | | | |
|---|---|---|---|
| 4,825,354 | 4/1989 | Agrawal et al. | 364/200 |
| 5,128,878 | 7/1992 | Gore et al. | 395/162 |
| 5,187,790 | 2/1993 | East et al. | 395/725 |
| 5,191,650 | 3/1993 | Kramer et al. | 395/200 |
| 5,247,651 | 9/1993 | Clarisse | 395/500 |
| 5,339,435 | 8/1994 | Lubkin et al. | 395/700 |
| 5,381,534 | 1/1995 | Shi | 395/200 |

OTHER PUBLICATIONS

Lurnix, "UNIX® Made Easy", 1990, pp. 21–25, 214–247, 527–551, 611–681.
Barkakati, "X window system programming", 1991, pp. 26–33, 78–79, 470–473, 516–519.
Comer, "Internet working with TCP/IP", 1991, pp. 365–375.

*Primary Examiner*—Larry D. Donaghue
*Assistant Examiner*—Mark H. Rinehart

[57] ABSTRACT

The present invention operates in a system in which a plurality of workstations are connected via communications lines. When a workstation outputs a message to another workstation, a message output unit identifier is set in an environment variable pertaining to a process which issues a message output request. The process obtains the message output unit identifier set according to the environment variable, and requests the message output workstation to output a message via communications lines. A requested workstation outputs the message on a predetermined unit. Thus, setting a message output unit for an environment variable easily specifies or modifies the message output unit by entering the command, etc. without modifying a program at all.

15 Claims, 21 Drawing Sheets

S204

REQUESTING TO OUTPUT MESSAGE TO OUTPUT UNIT IDENTIFIER THROUGH NETWORK

WAITING FOR ONE RESPONSE

NOTIFYING OF RESPONSE RESULT

Fig. 11C

MESSAGE CONTROL METHOD AND SYSTEM

This application is a continuation of application Ser. No. 08/123,257, filed Sep. 20, 1993, now abandoned.

BACKGROUND OF THE INVENTION

1. Field of the Invention

The present invention relates to a message control method and system used in a system comprising a plurality of information processing units connected via communication lines.

2. Description of the Related Art

The majority of conventional information systems are designed to perform a centrally controlled process (batch process) in which a plurality of terminals are connected to a large-scale general-purpose computer. However, since a reasonably-priced high-performance workstation (WS) has been developed recently, distributed processing systems such as client/server models have become more and more popular.

In these distributed processing systems, the most noticeable system is an open system for providing a multivendor environment. In most cases, a UNIX workstation (a workstation using UNIX as the operating system (OS)) is used as a computer forming the important part of an system.

UNIX has been accepted extensively in industry, and is available from a plurality of vendors. UNIX supports transmission control protocols (TCP) and Internet protocols (IP) which have become standards in industry as communication network protocols represented by a local area network (LAN). Specifically, unix excels in connecting workstations. Furthermore, UNIX provides various standard capabilities such as a NFS (network file system) function of gaining access to files in other stations, a Telnet and an rlogin functions of utilizing various resources of other workstations, a remote printer function of using printers connected to other workstations, an electronic mail function based on a simple mail transfer protocol (SMPT), etc.

In a network system such as a LAN which includes a plurality of workstations and personal computers, message communications are necessarily established among computers. The conventional method of controlling such message communications will now be explained.

FIG. 1 shows a method of preliminarily defining message output unit information in a file and determining message output units according to the defined information.

In the example shown in FIG. 1, if a message output request has been made in unit B, unit B refers to the message output unit definition information stored in File 1B, determines that the output unit of the present message is unit A, and sends a message display request to unit A via transmission line 2.

With this method, the message output unit definition information does not have to be stored in file 1B of unit B, but can be stored in other units in a network in which message output units are centrally managed. In this case, unit B refers to message output unit definition information stored in other units and issues a message display request to unit A.

Thus, in a method of preliminarily defining message output unit information, the output unit of a message is fixed because the output unit definition information is fixedly determined. Therefore, the method requires preparing message output unit definition information for each job if the output unit of a message should be changed for each job. However, this involves a complicated process. Additionally, a troublesome process of changing an output unit has been a disadvantage of the prior art technology.

FIG. 2 shows another method for solving the above described problem of the conventional method of controlling a message.

In the example shown in FIG. 2, an instruction code indicating a message output request exists in program 4 to be executed by unit B. A message output unit information is contained in the instruction code. When the instruction code is executed, a message output unit is determined according to the added output unit information.

When program 4 is written as containing the instruction code indicating a message output request in this method, the output unit of the message must be preliminarily determined and the program must be modified when the determined output unit should be changed.

Thus, the above described problem has often arisen in the conventional message control method because a message output unit is fixedly determined by a system (for example, a system console) or determined according to fixed message output unit information provided by a message requesting program.

Assume that the methods shown in FIGS. 1 and 2 are used in combination. That is, a combinational method which stores message output unit definition information in a file, includes, in an instruction code of a program indicating a message output request, a pointer to the output message in the file, and retrieves the message output unit from the file according to the pointer. Then, a message output unit can be changed during the execution of the program by changing the output unit definition information in the file. However, this still requires a process of setting and changing message output unit information, thereby leaving the problem unsolved.

Next, the activation of a target program in any other workstations (WS) as shown in FIG. 3 is explained as follows (the activation of a program is hereinafter referred to as the execution of a remote program). According to the conventional methods, the message outputted by an activated target program is outputted to a server workstation (WS) or to a system console. (In the system shown in FIG. 1, a message is outputted to a workstation (WS) according to preliminarily determined output unit definition information).

Thus, according to the conventional systems, a message output unit must be fixedly determined in a system. Therefore, during the execution of a remote program, a message output unit cannot be changed for each activated program, or for each activating time or client workstation (WS) so as to change the output unit of a message outputted by a target program executed in a server workstation (WS).

In the above described conventional methods, the output unit of a message is limited to a workstation (WS). However, a message can be outputted to a logical unit (logical screen, etc.). Nevertheless, the above described problem also arises in outputting a message to the logical unit.

Furthermore, in a system comprising a plurality of workstations (WS), synchronous control cannot be performed in an entire system when a workstation (WS) broadcasts to all the workstations (WS) in the system or a part of the a message requesting a response.

For example, as shown in FIG. 4, if the disconnection of a power source from WS 1 (a workstation is hereinafter referred to "WS") undesirably affects other WSs (WS 11, WS 12, and WS 13), then WS 1 broadcasts a message to all the other WSs or a part of them. At this time, WS 1 sends a message indicating the power disconnection to the WSs, but does not obtain the approval for the power disconnection from the operators of the other WSs. Therefore, WS 1 cannot determine whether or not it is permitted to be disconnected from the power source by sending the message only. In this case, it is desirable that the notifying WS 1 can perform synchronous control to determine whether or not it can really be permitted to be disconnected from the power source by waiting for and obtaining from all the notified WSs the response to the disconnection notifying message.

Conventionally, a synchronous control method can be an inter-process communications method, etc. However, an inter-process communication takes a large amount of overhead in an operating system, and all WSs are required to be loaded with a program for the inter-process communications, thereby causing various problems such as deteriorating the system performance, resulting in inefficient resource utilization, presenting complicated environment requirements, and increasing the number of steps for developing a system.

Conventionally, if WS 1 outputs to another WS (WS 11, WS 12, or WS 13) a message to be answered by the operator of the WS and continues a process after receiving the response, and if WS 1 outputs to a plurality of WSs a message to be answered only by the WSs assigned an operator, then inter-process communications as shown in FIG. 5 are required. In this case unfortunately, the above described problems have also arisen.

SUMMARY OF THE INVENTION

The present invention has been developed based on the above described background.

The first object of the present invention is to easily specify or change a message output unit in a system in which a plurality of information processing units are connected through a network.

The second object of the present invention is to specify or change the message output unit by specifying or changing only a process environment without modifying a program.

The third object of the present invention is to easily specify a message output unit at a child process by obtaining a message output unit identifier according to an environment variable inherited by a child process from a parent process.

The fourth object of the present invention is to easily perform synchronous control without deteriorating the system performance when a message outputted to all units or a part of them in a network requires a response.

The invention relates to a message control method for use in a system in which a plurality of information processing units are connected via communications lines so as to output a message from one of the information processing units to another information processing unit. The method comprises the steps of setting a message output unit for an environment variable pertaining to a process which requests another information processing unit to output a message; and requesting the message output unit to output the message after obtaining the message output unit from the environment variable when outputting the message.

According to this invention, a message output unit is set for an environment variable pertaining to a process, and each process outputs a message on the message output unit after obtaining message output unit information according to the environment variable. An environment variable can be easily set by an operator's entering an environment variable set command. Therefore, a message output unit can be easily changed by changing the environment of a process without modifying a program at all.

In a system in which a child process activated by a parent process inherits an environment variable pertaining to the parent process, message output unit information can be successfully transmitted to the child process by the parent process only by activating the child process. Therefore, message output unit information can be easily transmitted from a parent process to a child process. The effect can be recognized conspicuously when a parent process activates a plurality of child processes.

The invention may also relate to a message control method for use in a system in which a plurality of information processing units are connected via communications lines so as to output a message requiring a response from one of the information processing units to another information processing unit. The method comprises the steps of: setting all message output units for an environment variable pertaining to a process which requests another information processing unit to output the message requiring a response; requesting the message output units to output the message after obtaining the message output unit identifiers from the environment variable when outputting the message requiring a response; and waiting for the responses from the message output units and notifying the message requesting unit of the result of the received responses.

According to this invention, if a plurality of message output units are set for an environment variable pertaining to a process and a message output request has been issued, then response result information is transmitted to the message source after determining a plurality of message output units according to the environment variable, outputting a message on the message output units, and receiving a response from each of the message output units or from the first unit to return the response.

Therefore, a message can be broadcasted and a synchronous control of a system can be performed using a response waiting function without inter-process communications.

The invention, futher, may relate to a message control method for use in a system in which a plurality of information processing units are connected via communications lines. The method comprises the steps of: transmitting data pointing to a message output unit to which a program outputs a message when an information processing unit requests to activate the program in another information processing unit from the activating information processing unit for issuing a request to activate the program to the program-activated information processing unit; setting, in the program-activated information processing unit, a message output unit notified by the activating information processing unit for an environment variable pertaining to a process for activating the program according to the activation request; and outputting a message to a message output unit after a process of the program activated by the process sets the message output unit according to its own environment variable.

According to this invention, when a program in an information processing unit (target program) is to be activated (executed) through a remote program execution, a message output unit to which the target program outputs a message is transmitted by a client information processing unit of the target program to a server information processing unit. The transmitted message output unit is set for an environment variable pertaining to the remote program execution receiving process in the server information processing unit to activate the target program. The target program obtains the message output unit identifier according to the environment information, and outputs an output message to the message output unit according to the information.

Therefore, the client information processing unit easily specifies a message output unit of a target program in the server information processing unit, and easily specifies a message output unit of a subprogram (child program) activated by the target program.

BRIEF DESCRIPTION OF THE DRAWINGS

FIGS. 11A, 11B and 11C show examples of realizing the processes performed in steps S204, S251, and S252 described in the flowchart shown in FIG. 10 according to a program in C language;

DESCRIPTION OF THE PREFERRED EMBODIMENTS

The embodiments of the present invention is explained as follows by referring to the attached drawings.

Figure 1:
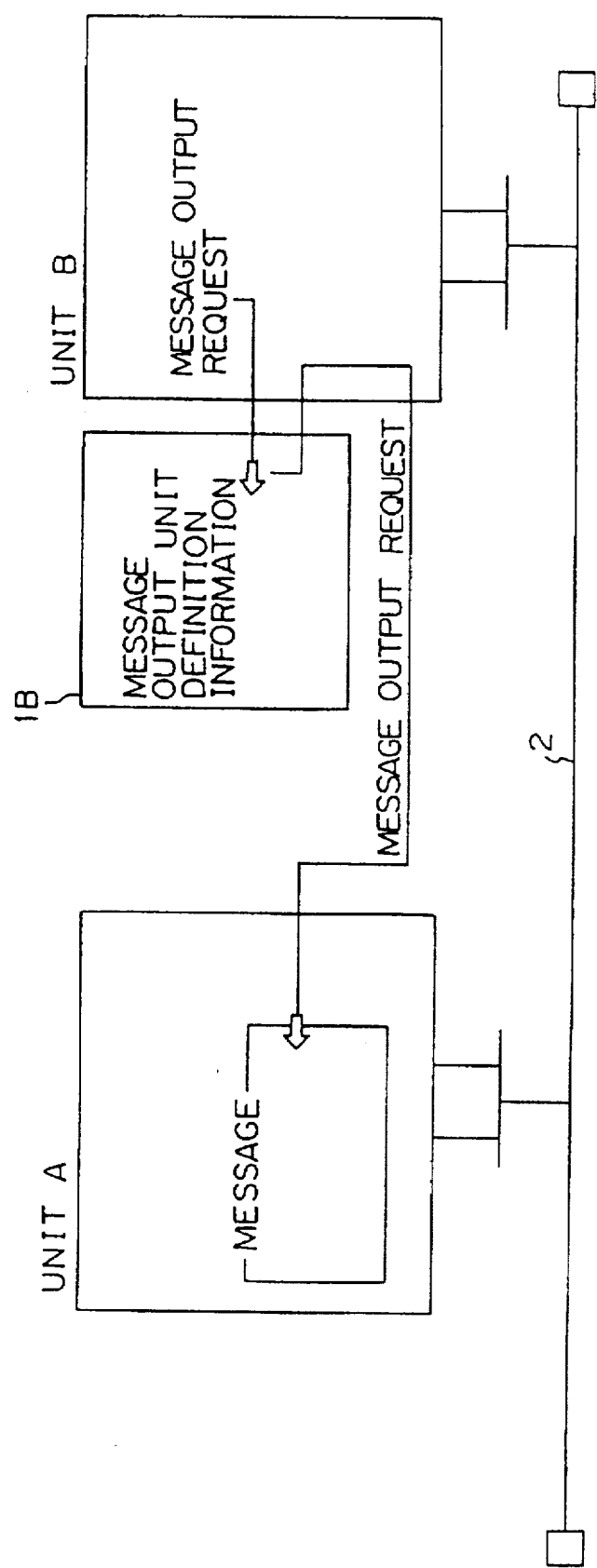
FIG. 1 shows an example of a conventional message control method.
Figure 2:
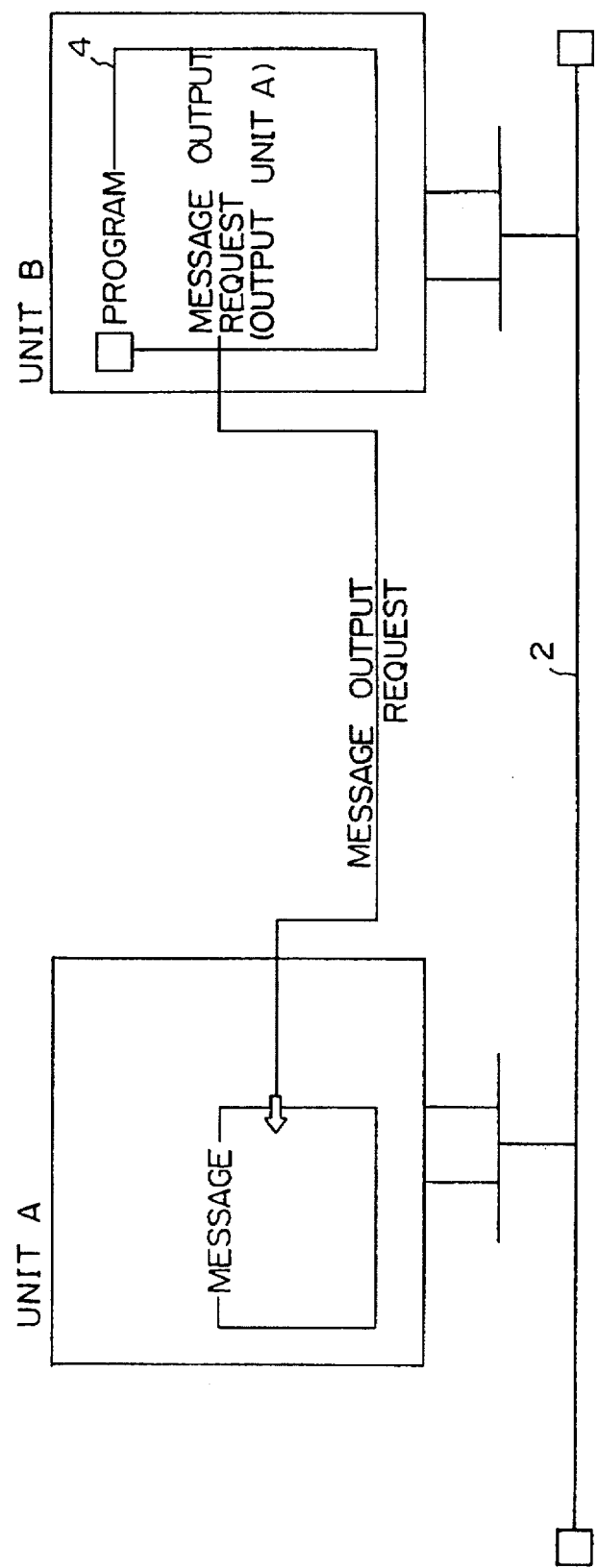
FIG. 2 shows another example of a conventional message control method.
Figure 3:
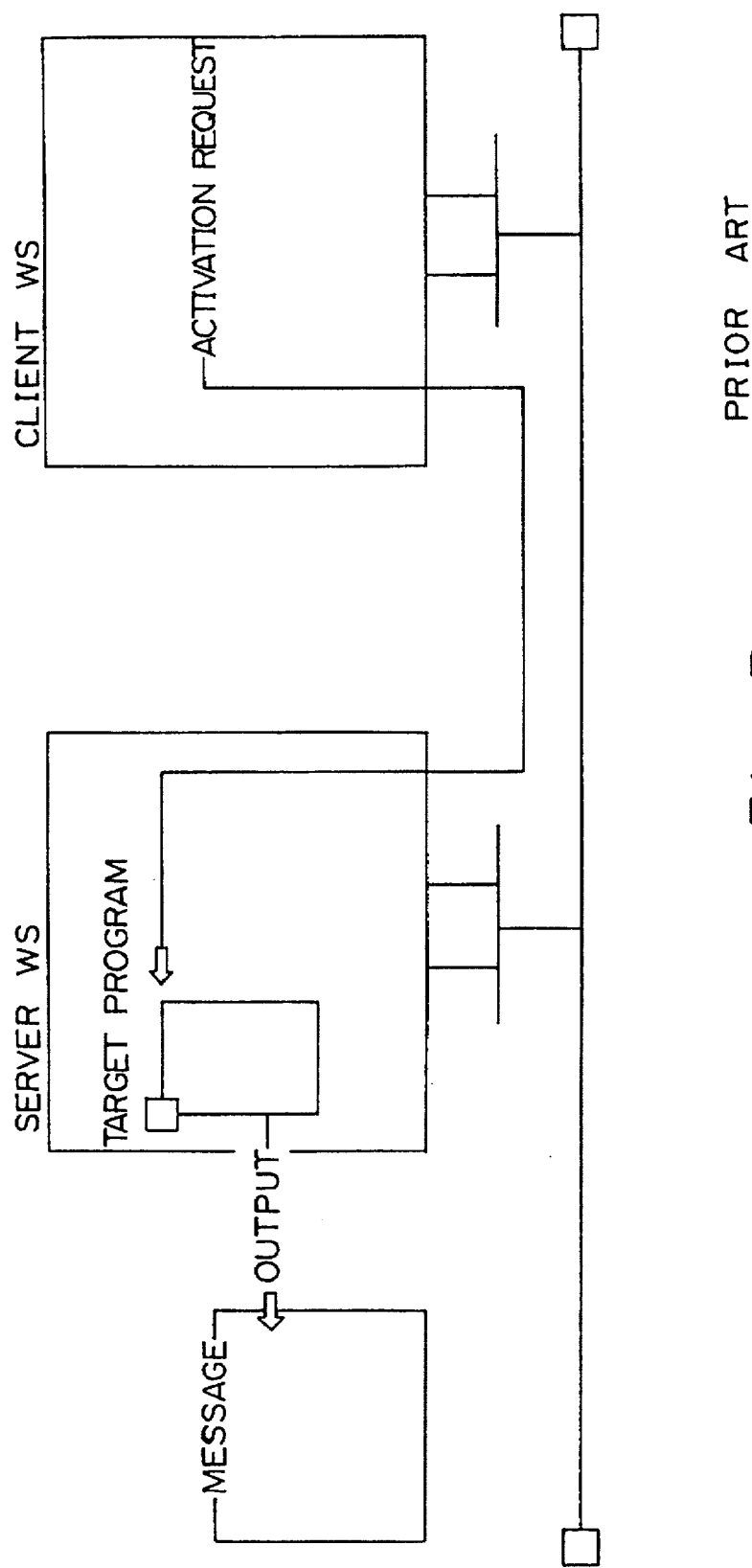
FIG. 3 shows a method of displaying a message in executing a conventional remote program.
Figure 4:
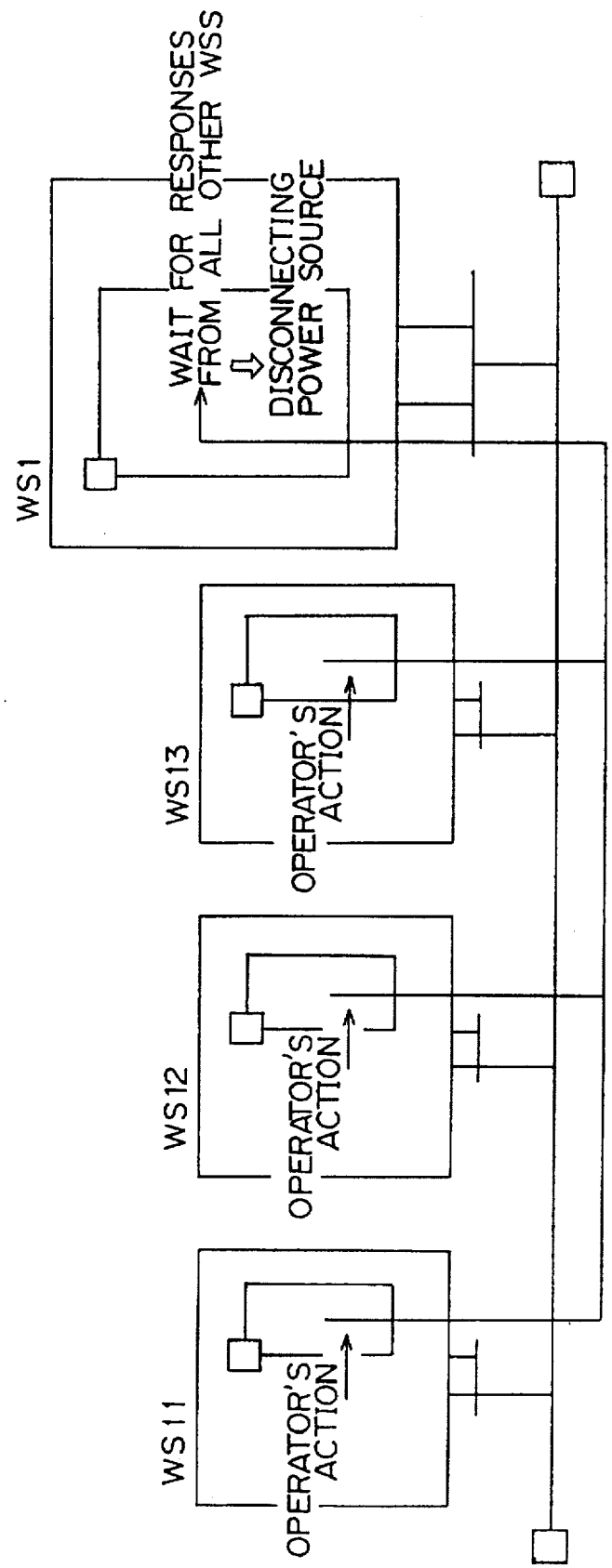
FIG. 4 shows an example of synchronization performed when a power source of a work station is disconnected in inter-process communications.
Figure 5:
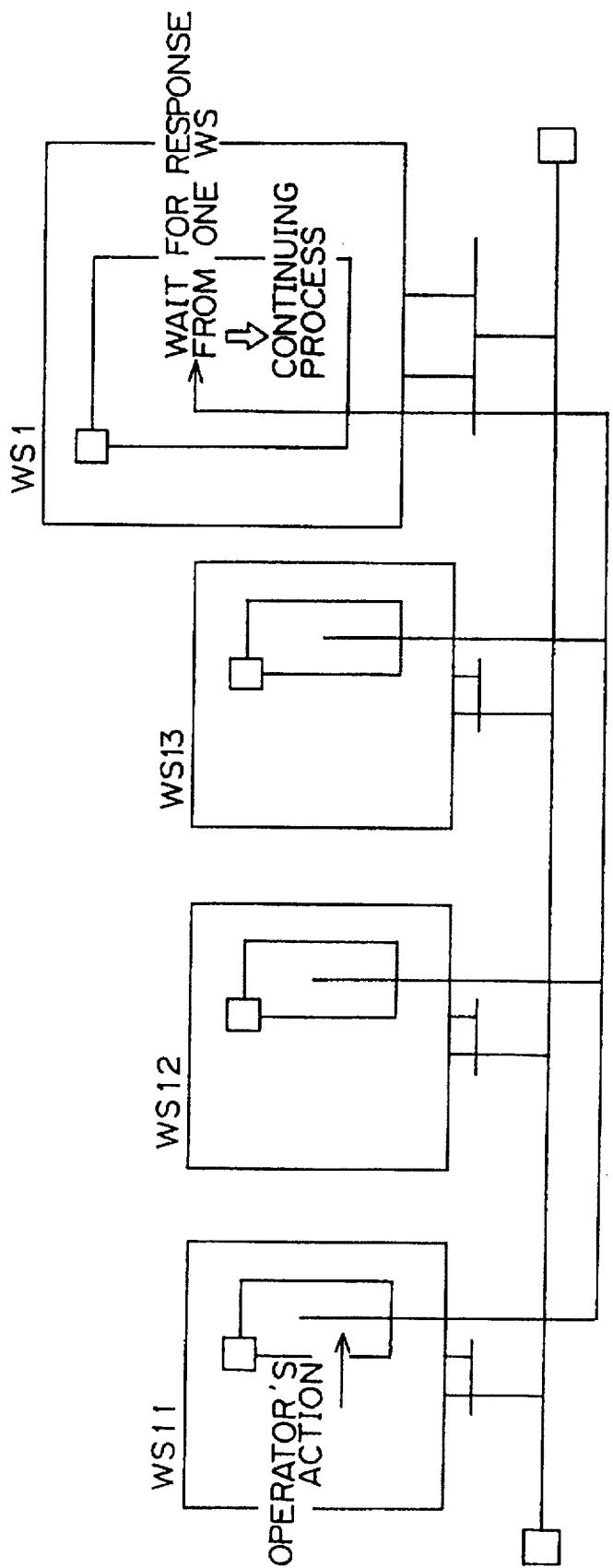
FIG. 5 shows an example of receiving a response from a work station in a conventional inter-process communications.
Figure 6:
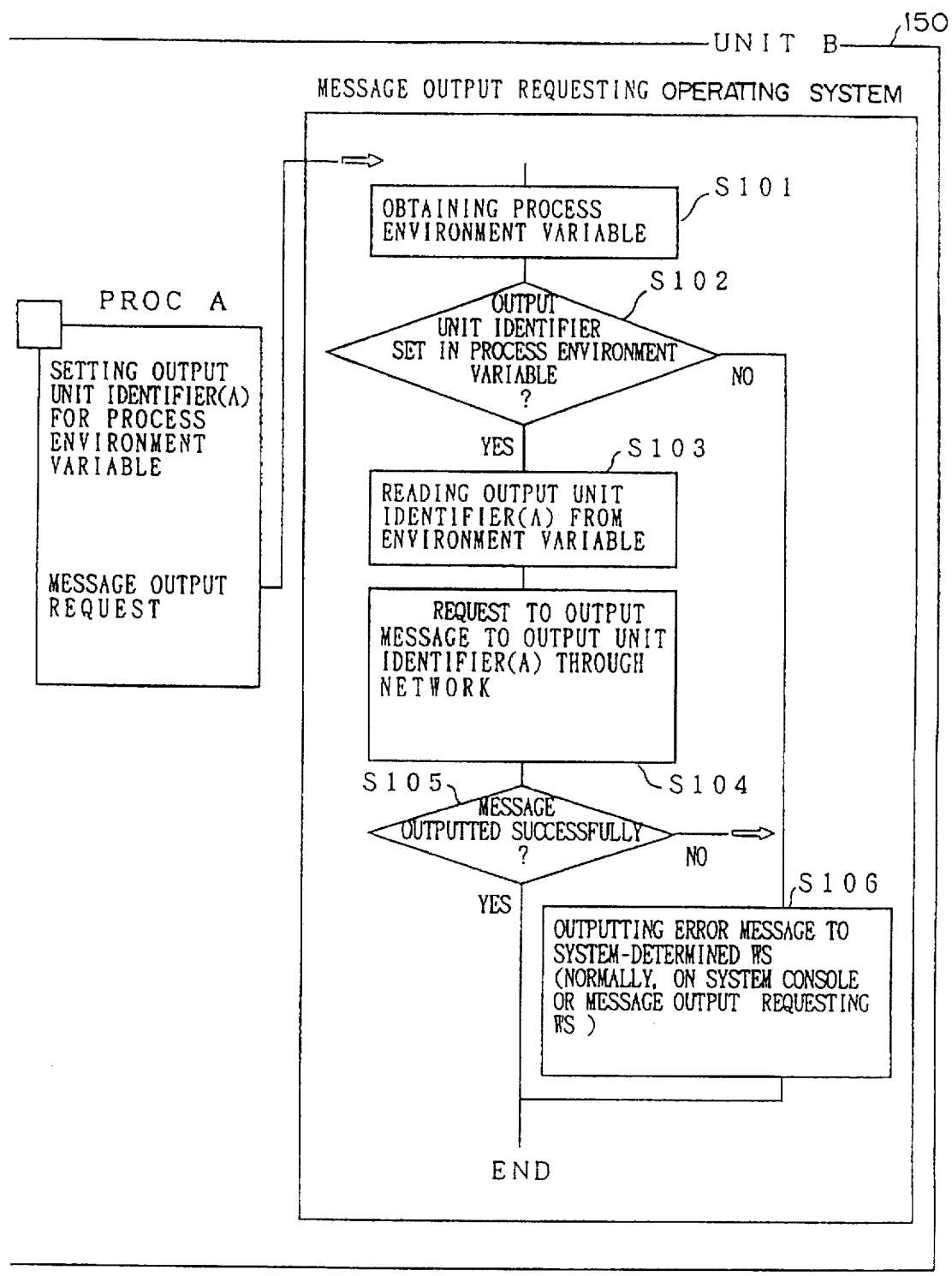
FIG. 6 shows a message display control method in transmitting a plurality of output units according to message output unit identifiers based on the first embodiment of the present invention.
Figure 7:
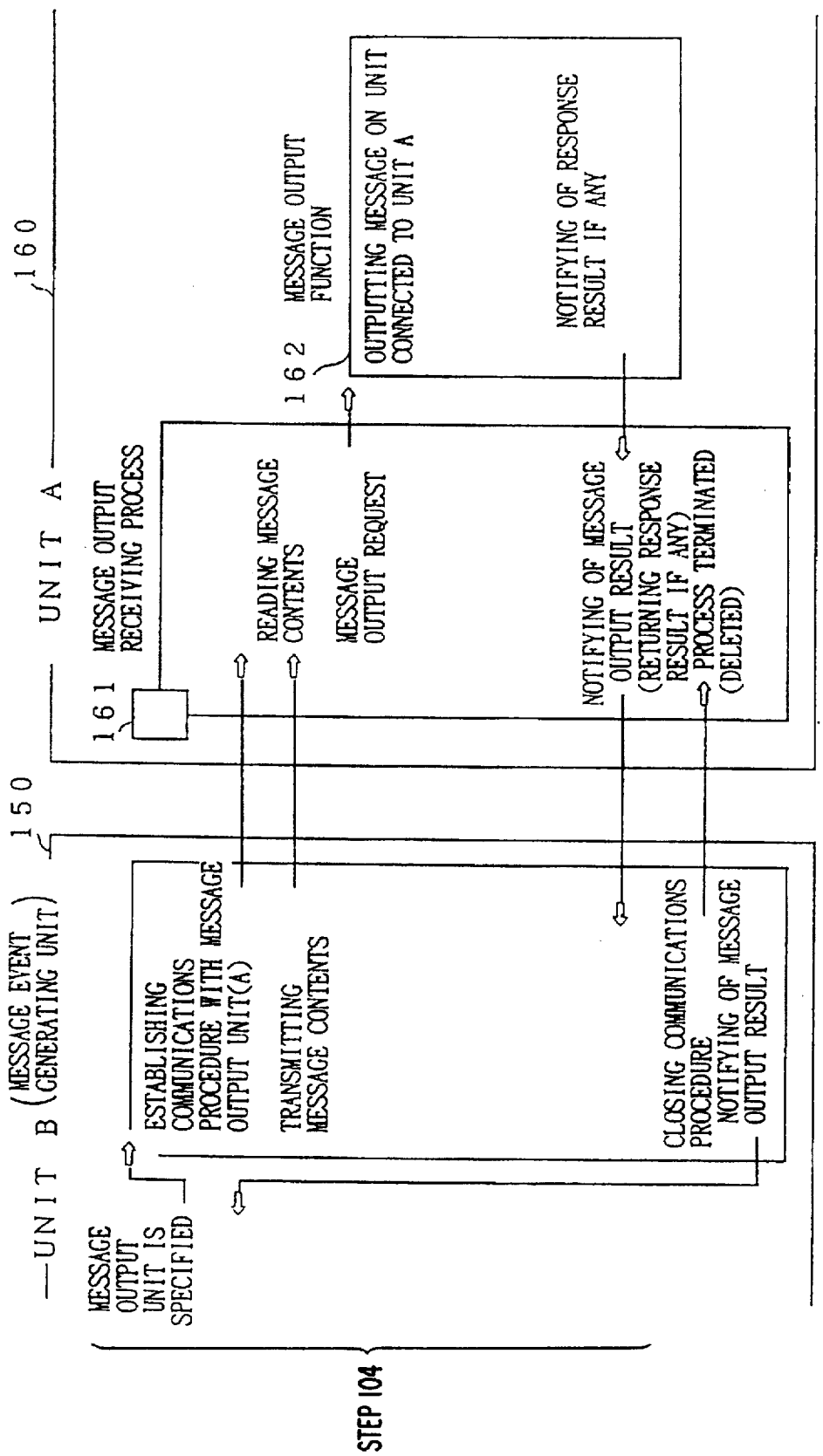
FIG. 7 shows in detail the process performed in step S104.

FIGS. 6 and 7 shows the message control method according to the first embodiment of the present invention.

In FIG. 6, if process A (PROCA), generated and executed by unit (workstation) B150, outputs a message to unit (workstation) A160, then process A sets an identifier of unit (workstation) A160 as an output unit identifier (A) indicating a message output unit for its process environment variable. Then, process A specifies the contents of the message and issues a message output request. The operating system processes a message output request as shown on the right in FIG. 6. An output unit identifier (A) is set for the process environment variable by, for example, executing a predetermined command. Then, an optional message output unit can be determined by executing a command.

First, in this message output requesting process, the above described process environment variable is obtained (S101). Then, it is determined whether or not an output unit identifier is set for the obtained process environment variable (S102). If yes, the output unit identifier (in this case, an output unit identifier (A)) is read from the above described process environment variable (S103).

Then, the above described message content output request is issued to a WS assigned an output unit identifier (A) through a network, that is, unit A160 (S104).

Then, a response to the message is waited for from the message requested unit A160. If the response to the message has been received, it is examined whether or not unit A160 has successfully outputted a message (S105).

If unit A160 has successfully outputted a message, then the message output requesting operating system is immediately returned to user process (PROCA). If it has failed in outputting a message, an error message is outputted to a specific unit predetermined by the system (S106), and the operating system is returned to user process (PROCA). Thus, the error message is outputted to an output unit such as a system console, a display of a message output requesting unit B150, etc.

In step S102, if an output unit identifier is not set for the process environment variable, step S106 is immediately executed, and the process is terminated.

Thus, in the first embodiment, if a message output request is issued, it is determined whether or not a message output unit specifying environment variable exists in the environment variables pertaining to the message output requesting process. If the answer is yes, control is made such that a message is outputted to the unit specified by the environment variable.

Next, the detailed operation of step S104, illustrated in the flowchart shown in FIG. 6, is explained by referring to FIG. 7.

In step S104, the above described unit (message event generator) B150 issues a message output request to unit A160 assigned an output unit identifier (A) by process A. When the request is outputted over a network, a network monitoring process generates and activates a message output receiving process 161 in unit A160 specified as the output unit of the above described message.

Next, process A in which unit B150 issues a message output request establishes a communications procedure (protocol) to realize communication network with unit A160. Then, unit B150 in process A transmits the contents of a message to be outputted by unit A160 to the message output receiving process 161 in unit A160 through the network.

On receiving (reading) the contents of the message through the network, the message output receiving process 161 issues a message output request to a message output function 162.

The message output function 162 outputs (displays) the contents of the above described message to the output unit, for example, a display, of unit A160. A determination as to whether or not the message was successfully outputted is returned to the message output receiving process 161. If a response to the message is returned by the operator, the response is also transmitted to the message output receiving process 161.

On receiving the message output result, the message output receiving process 161 transmits the message output result (together with the above described response if returned) to unit B150 through the network.

On receiving the message output result, unit B150 in process A terminate the communications with unit A160, and makes a determination in step S105 according to the flowchart shown in FIG. 6, based on the received message output result. When the communications procedure is terminated, the message output receiving process 161 is deleted by the network monitoring process.

Thus, in the first embodiment, a message output unit identifying environment variable is detected in the environment variables pertaining to a message output requesting process. A message output unit is specified using the environment variable. In each process, a message output unit can be dynamically specified by setting a process environment variable. If a message output unit should be changed, only an environment variable of process A must be changed without modifying an associated program. Furthermore, in a system in which a process environment variable of a parent process is inherited by a child process, the child process can easily output a message to an output unit specified by an environment variable inherited by the parent process. Specifically, a message output unit identifier is easily transmitted from a parent process to a child process using an environment variable.

Figure 8:
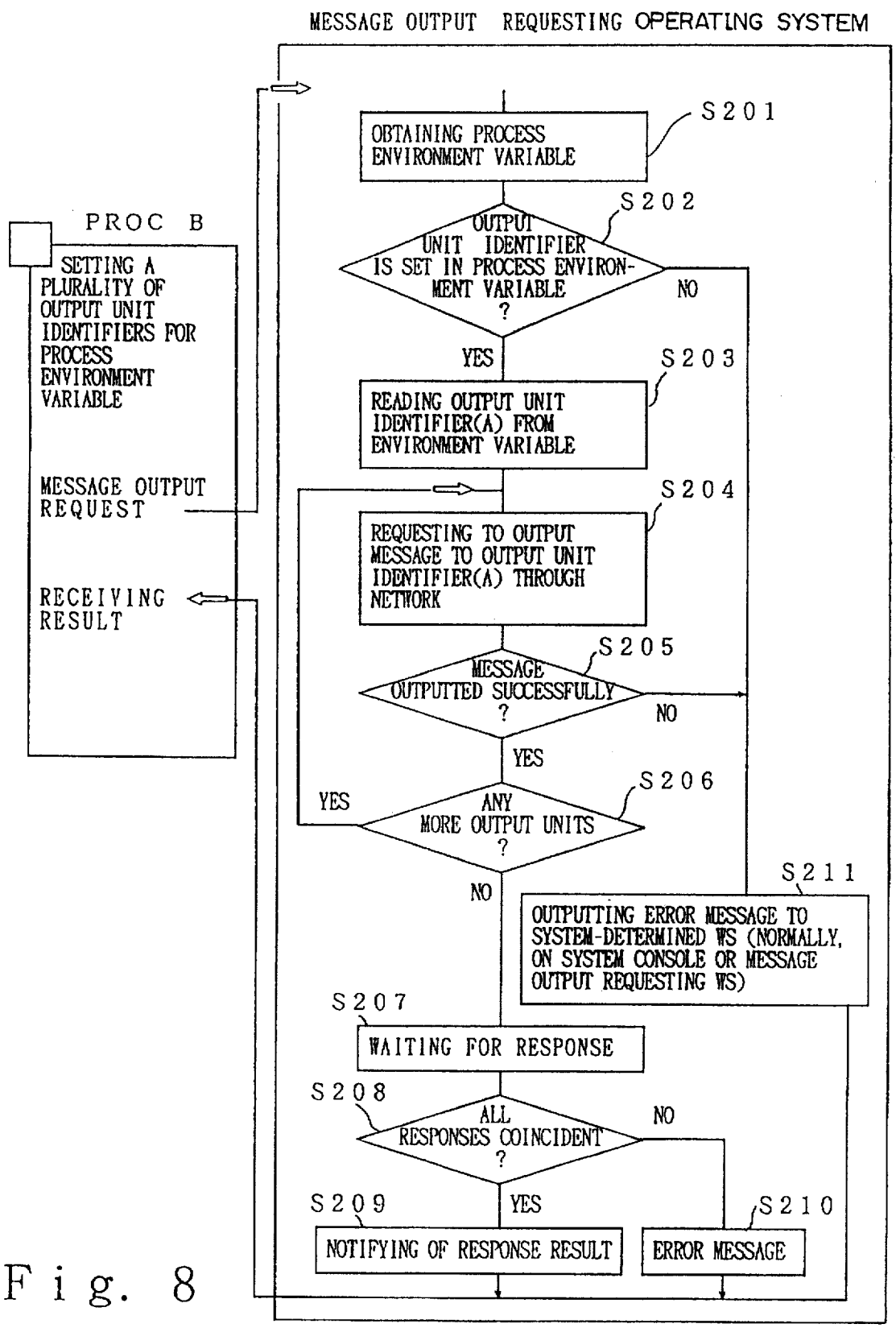
FIG. 8 shows a control method in which a message is outputted to a plurality of units according to the second embodiment of the present invention, and the message requires a response.
Figure 10:
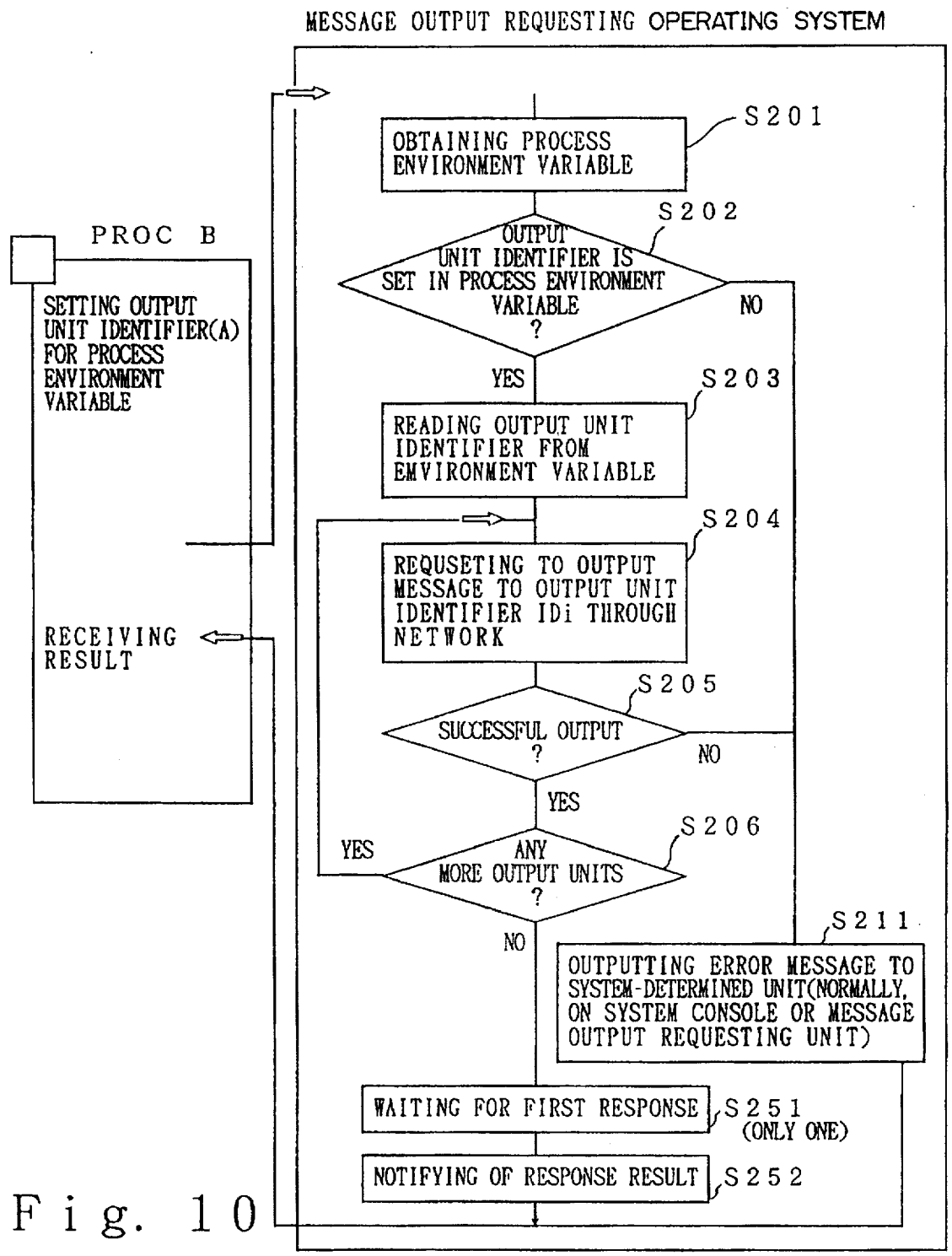
FIG. 10 shows a control method in which a message is outputted to a plurality of units according to the second embodiment of the present invention, and a response is required from the first unit to answer the message.

The second embodiment according to the flowchart in FIGS. 8 and 10 shows an example of a message control method in which a unit outputs (displays) a message to a plurality of units.

First, process B (PROCB) sets a plurality of output unit identifiers as a process environment variable, and issues a message output request with the contents of an output message specified. At this time, an environment variable can be set by executing a predetermined command, etc.

A message output request can specify a plurality of units as message output units, and the message requires a response. The response can be specified in one of the following two methods.

1. All responses are required.
2. Only the first response is required.

If method 1 above is selected in waiting for responses, the response results are transmitted to the message output requesting process B when all response results match. If all response results do not match, an error notification is transmitted to process B.

The operation of the message output requesting process assigned response waiting method 1 and performed by a predetermined message output function by referring to the flowchart shown in FIG. 8.

First, process environment variables set by the above described process B are obtained (S201). Then, it is determined whether or not an output unit identifier is detected in the obtained process environment variables (S202).

If an output unit identifier is detected, all output unit identifiers $ID_1$, $ID_2$, ... are read from the process environment variables (S203), and a request to output a message specified by the message output request is issued to unit $A_1$ assigned an output unit identifier $ID_1$ in a plurality of obtained output unit identifiers (S204).

Then, status information indicating whether or not the message output request has been successfully accepted is entered through a network, and determination is made as to whether or not the message output request is accepted (S205).

If the message is successfully outputted ("Yes" in S205), it is determined whether or not any unit $A_i$ (i=2, 3, ...) has not outputted a message (S206). If yes, steps S204 and S205 are performed on all the remaining units $A_2$, $A_3$, ...

If it is determined that messages have been outputted by all units $A_1$, $A_2$, ... ("No" in S206), then responses to the message are waited for from all units $A_1$, $A_2$, ... (S207).

If all responses have been received through the network, it is determined whether or not all the response results match (S208). If yes, the response result is transmitted to the message output requesting process B (S209).

If all the response results do not match in step S208, ("No" in S208), an error notification is transmitted to process B (S210).

In step S202, if no output unit identifiers are detected in the process environment variables, then the specified message is outputted to a unit preliminarily specified by the system (normally, a system console or a message output requesting unit)(S211), and control is returned to process B.

In step S205, if a message output request has failed ("No" in S205), then a predetermined error message is outputted to a unit preliminarily specified by a system (normally, a system console or a message output requesting unit)(S211), and control is returned to process B.

Figure 9A:
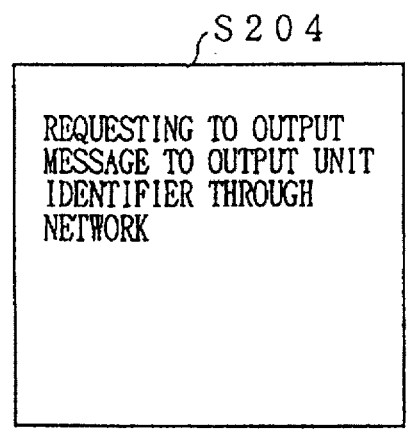
FIGS. 9A, 9B and 9C show examples of realizing the processes performed in steps S204, S207, and S208 shown in FIG. 8, according to a program in C language.
Figure 9B:
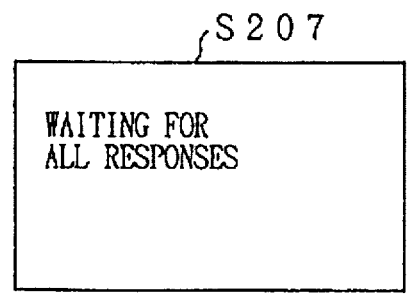
Figure 9C:
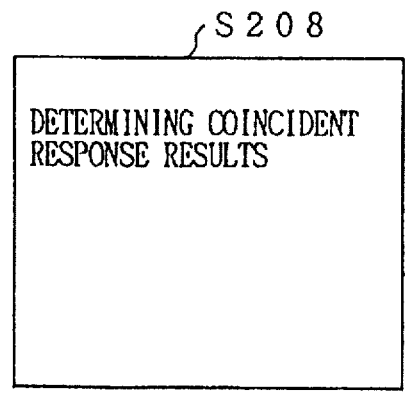

FIGS. 9A, 9B, and 9C show examples of realizing in C language the processes performed in steps S204, S207, and S208 respectively described in the flowchart shown in FIG. 8. Concerning "msgout,msgrev" shown in FIGS. 9A and 9B, "msgout" is a message output function, while "msgrev" is a message reception function. In this embodiment, the message output function "msgout" indicates a request to output a message, while the message receive function "msgrev" receives a response result.

Next, the flowchart shown in FIG. 10 describes the process performed when the above described response waiting method 1 is specified, or more specifically, when a message output request (message display request) is issued informing that only the first response is required. The message output requesting process is performed by calling a predetermined message output function.

The process is almost the same as that performed when the above described all response waiting method is selected. Actually, the response waiting processes in steps S207 and S208 shown in FIG. 8 are replaced with the processes in steps S251 and S252.

That is, in the message output requesting process described in the flowchart shown in FIG. 10, a message output request is issued through a network in steps S204–S206 to units $A_1, A_2, \ldots$ for all output unit identifiers $ID_1, ID_2, \ldots$. At this time, only the first response is waited for (S251). On receiving the first response through the network, the response result is immediately transmitted to process B.

FIGS. 11A, 11B, and 11C show an example of realizing the process performed in C language in steps S204, S251, and S252 described in the flowchart shown in FIG. 10.

Next, the third embodiment of the present invention is explained as follows.

Figure 12:
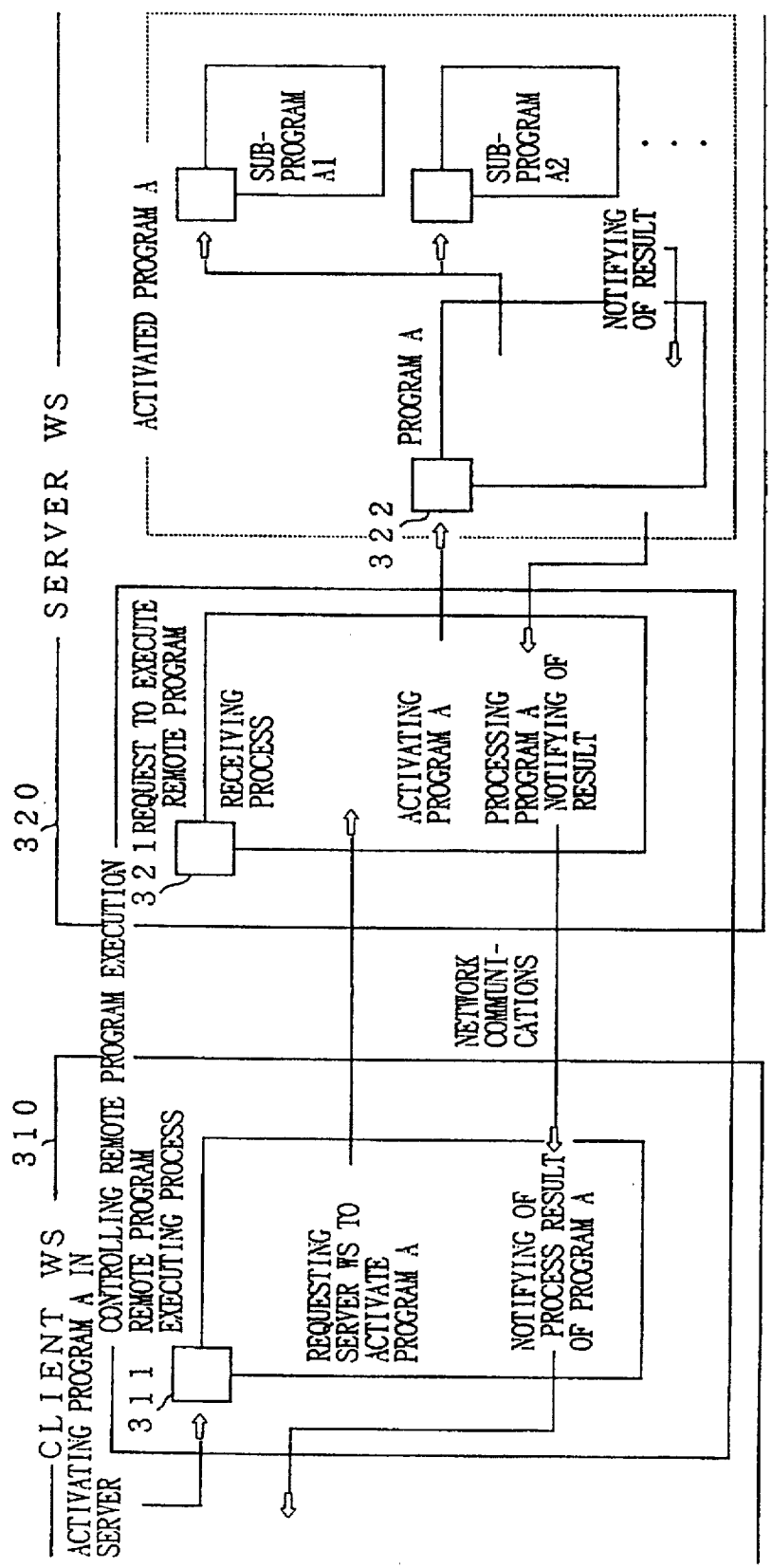
FIG. 12 shows a method of controlling the execution of a remote program applied to the third embodiment of the present invention.

According to the third embodiment of a message control method, in a system in which a plurality of WSs (workstation) are connected through a network, a WS (client WS) activates a target program in another WS (server WS), and the target program activates a plurality of child processes. FIG. 12 shows an example of a system according to the embodiment.

In FIG. 12, WS 310 (client WS) activates program A of server WS 320 (server WS) under remote program execution control. More specifically, when WS 310 issues, by entering a command, etc., a request to activate program A of WS 320 under remote program execution control, process 311 for executing a program in another WS is generated in WS 310. Then, remote program executing process 311 transmits, to WS 320 through a communication network, the request to activate program A in WS 320.

On receiving, through the communication network, the request to activate program A, remote program execution request receiving program 320 in WS 320 immediately activates program A 322.

When activated, Program A 322 sequentially generates and activates subprograms $A_1, A_2, \ldots$ in a plurality of child processes. If all the subprograms $A_1, A_2, \ldots$ have been executed, the execution results are notified to program A 322.

On receiving the notification, program A 322 notifies remote program execution request receiving process 321 of the notification as the process result of itself. On receiving the notification, remote program execution request receiving process 321 notifies, through, the communication network remote program executing process 311 of the process result of program A 322. The remote program executing process 311 further notifies a process, which has issued the request to activate program A 322, of the process result of program A.

Figure 13:
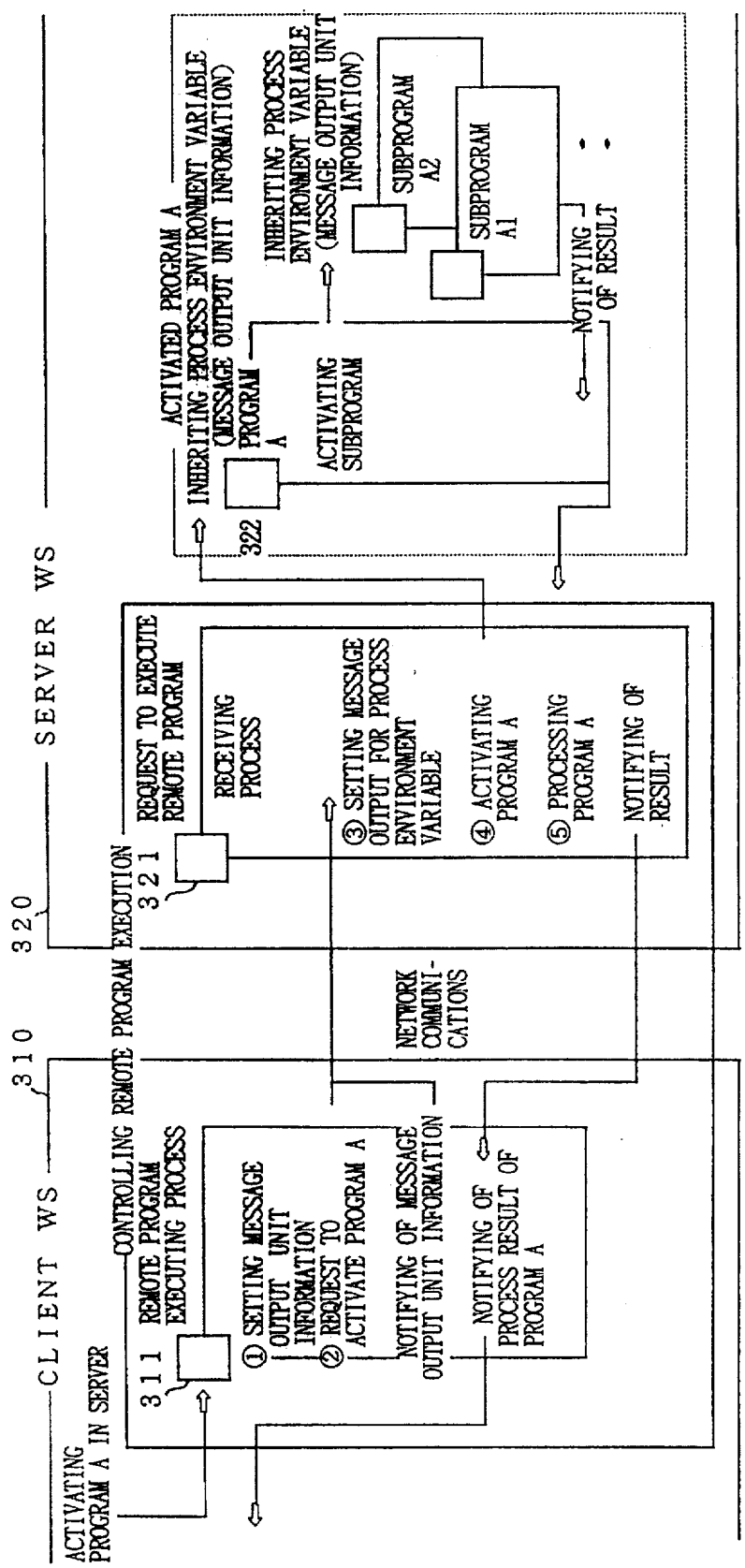
FIG. 13 shows a message control method in controlling the execution of a remote program applied to the third embodiment of the present invention.

A message control method in which the above described client WS 310 activates program A 322 in server WS 320 under remote program execution control is now explained by referring to FIG. 13.

In WS 310, if a request to activate program A in server WS 321 has been issued, remote program executing process 311 in WS 310 sets message output unit information.

Then, remote program executing process 311 transmits to WS 320 the request to activate program A 322 in WS 320 through the communication network. At this time, the message output unit information is transmitted to WS 320 through the communication network.

On receiving the request to activate program A 322 in WS 320 and the message output unit information through the communication network, remote program execution request receiving process 321 in WS 320 sets the message output unit information for its process environment variable. Then, it activates program A 322.

At this time, since program A 322 is a child process of remote program execution request receiving process 321, it inherits the environment variable of remote program execution request receiving process 321.

Then, program A 322 sequentially generates and activates subprograms $A_1, A_2, \ldots$. However, since these subprograms $A_1, A_2, \ldots$ are child processes of program A, subprograms $A_1, A_2, \ldots$ also inherit the process environment variable of the above described remote program execution request receiving process 321. Therefore, subprograms $A_1, A_2, \ldots$ can obtain, according to its own environment variable, the message output unit information set by remote program execution process 311 in another WS 310.

When subprograms $A_1, A_2, \ldots$ output a message to a message output unit set by remote program execution process 311 in the client WS 310, they activate each message output function for performing a message output requesting process shown in FIG. 6, 8, or 10 depending on each purpose. Thus, subprograms $A_1, A_2, \ldots$ output a message on a message output unit set by remote program executing process 311 in the client WS 310 by activating the message output function without recognizing a message output unit at all.

Accordingly, a message output unit can be specified in a target program, in server WS 320, generated and activated by remote program execution request receiving process 321 if, in server WS, remote program execution request receiving process 321 sets message output unit information received from the client WS 310 for its own environment variable. Thus, in executing a remote program, a message output unit can be easily notified to the target program in another WS.

Figure 14:
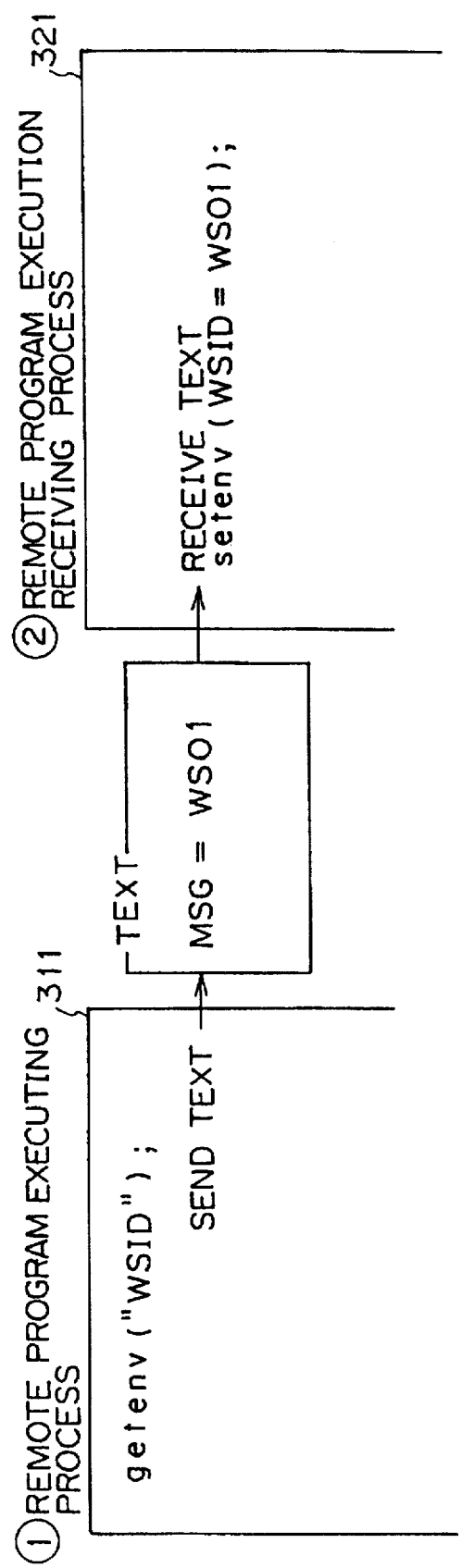
FIG. 14 shows an example of a process, programed in C, of an important part of the present invention according to the third embodiment shown in FIG. 13.

FIG. 14 shows an example of a program, in C language, for realizing the message output control method under the above described remote program execution control.

First, remote program executing process 311 in the client WS 310 obtains message output unit information "WS01" by executing a system console getenv ("WSID=") according to its own environment variable WSID, prepares the message output unit information "WS01" as a text; and transmits it to remote program request receiving process 321 in WS 320 through the communication network.

Remote program request receiving process 321 sets the received message output unit information "WS01" for its own process environment variable WSID by executing a system call setenv (WSID=WS01). Thus, the message output unit information "WS01" is transmitted according to an environment variable to program A 322 (a child process of remote program request receiving process 321) generated and activated by remote program request receiving process 321, and subprograms $A_1, A_2, \ldots$ (child processes of program A 322) generated and activated by program A.

Figure 15:
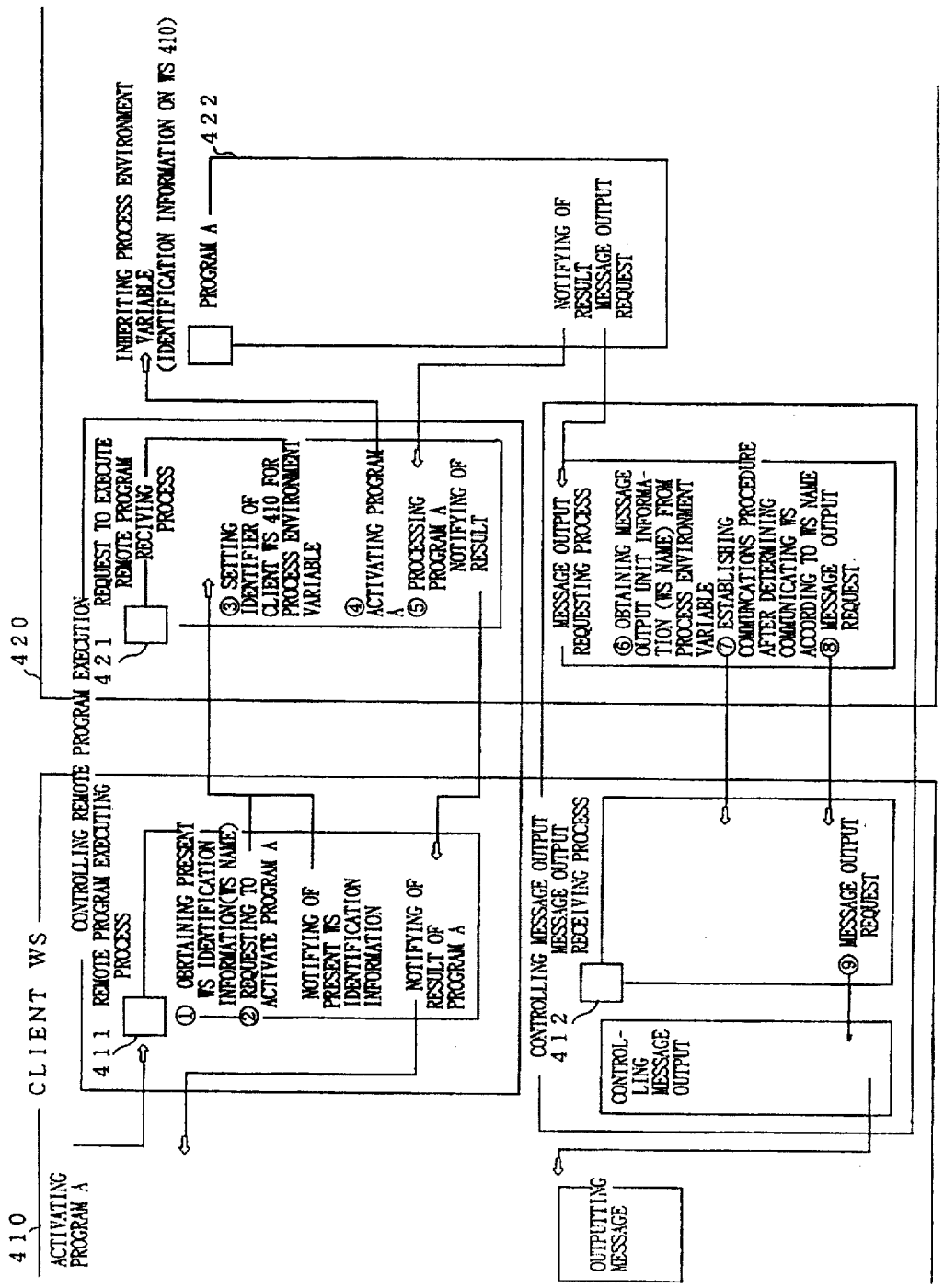
FIG. 15 shows an example of applying the present invention to the display of a target program in executing a remote program.

FIG. 15 shows an example that a target program in a WS activated by a client WS's performing a remote program execution displays a message on the client WS according to the first and third embodiments.

In this case, the message output unit exists in a client WS 410, and a WS identifier of WS 410 is notified by the client WS 410 to a server WS 420 in a remote program execution performed through the communication network.

In the example shown in FIG. 15, remote program executing process 411 in the client WS 410 sets the identifier information (WS name) pointing to a WS to which it belongs as message output information, and issues a request to activate program A 422 in WS 420 to remote program execution request receiving process 421 in WS 420. When the activation request is issued, the message output unit information (identifier information pointing to a WS to which it belongs) is notified to remote program execution request receiving process 421.

On receiving a request to activate program A 422 and the WS name of WS 410, remote program execution request receiving process 421 sets the WS name for its own environment variable, and generates and activates program A 422.

The activated program A 422 inherits the environment variable of its parent process, that is, remote program request receiving process 421.

Then, after performing a predetermined process, program A 422 notifies remote program execution request receiving process 421 of the process result. Remote program execution request receiving process 421 notifies remote program executing process 411 in WS 410 of the process result of program A 422 through the communication network.

Remote program executing process 411 notifies a process which has issued the request to activate program A 422 of the received process result of program A 422.

On the other hand, after the notification of the process result, program A 422 specifies predetermined contents of a message, and issues a message display request to display the message.

In processing the message display request, program A 422 retrieves message output unit information from its own environment variable. Program A 422 inherits the environment variable from its parent process, that is, remote program execution request receiving process 421, and obtains the WS name of WS 410 as a message output unit according to the above described environment variable.

Then, it determines the obtained WS name as the name of a WS for outputting a message, and establishes a communications procedure with the WS. Since the WS name indicating the message output unit, which is set for the above described environment variable, equals the identifier information (WS name) on WS 410, a communications procedure is established between WS 420 and WS 410.

Next, program A 422 transmits to message display receiving process 412 in WS 410 a request to display a message designating the predetermined message contents through the network. On receiving the request, message display receiving process 412 in WS 410 executes the request to display the specified message contents.

At the message display request, a message output control process is performed, and the predetermined message contents are displayed on a display unit.

As described above, at the request of client WS 410, program A 421 in WS 420 is processed by a remote program execution, and displays a desired message on the display unit of WS 410 after being assigned the client WS 410 as a message display unit according to the environment variable inherited from its parent process, that is, remote program execution requesting process 421.

Figure 16:
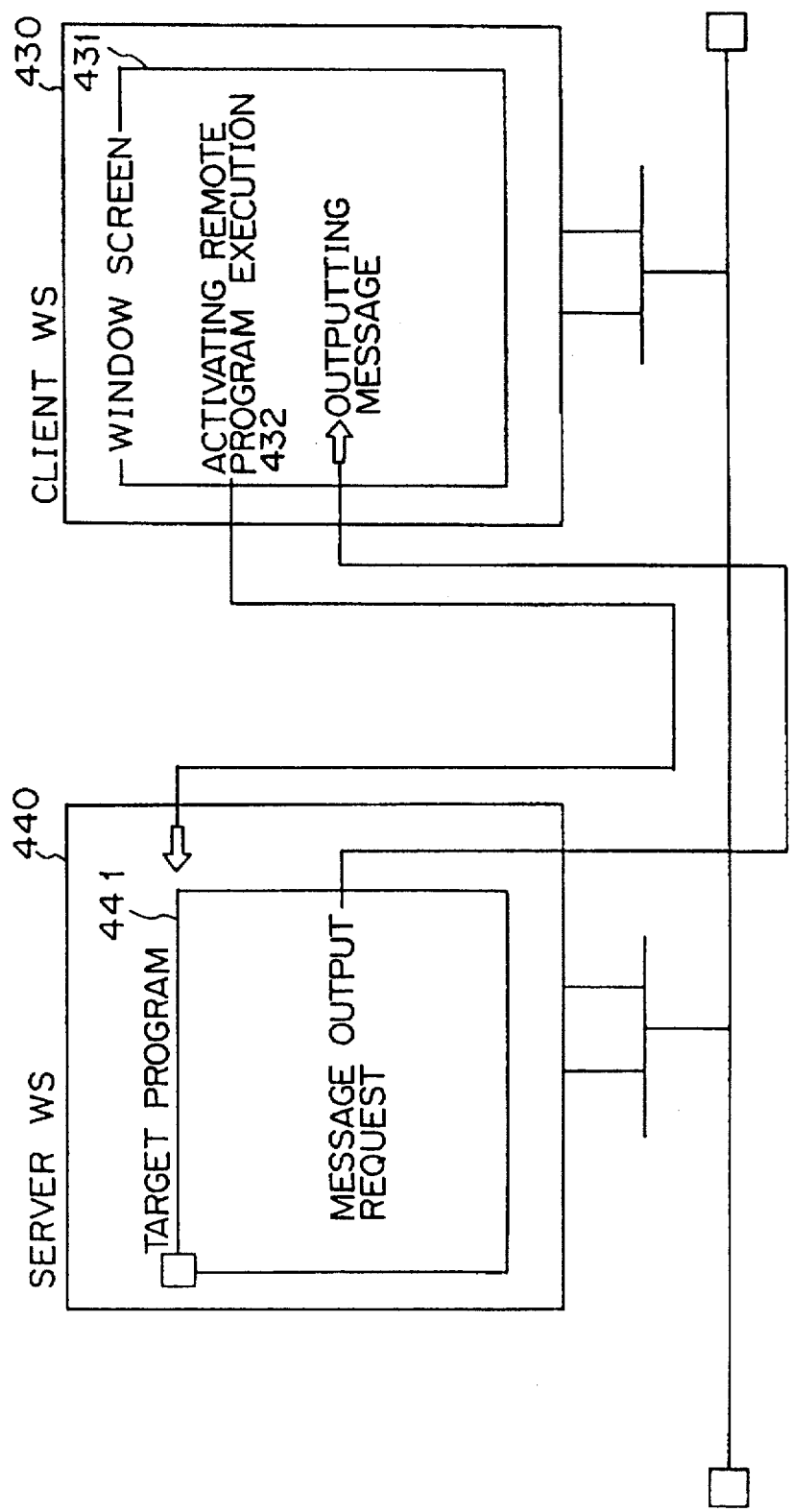
FIG. 16 shows an example of applying the present invention to display a predetermined message in a target program by performing a remote program execution.

Next, FIG. 16 shows an example in which target program 441 in a server WS 440 is executed through a window screen 431 in a client WS 430 after being activated by a remote program execution. In this example, a message to be displayed by target program 441 is displayed on the window screen 431 in the client WS 430 which requests the remote program execution.

To realize the above described message display control, the window screen 431 in the client WS 430 functions as a process (executable unit), and a remote command execution command (program) 432 activated on the window screen 431 functions as a child process of the above described window screen (window process) 431.

Figure 17:
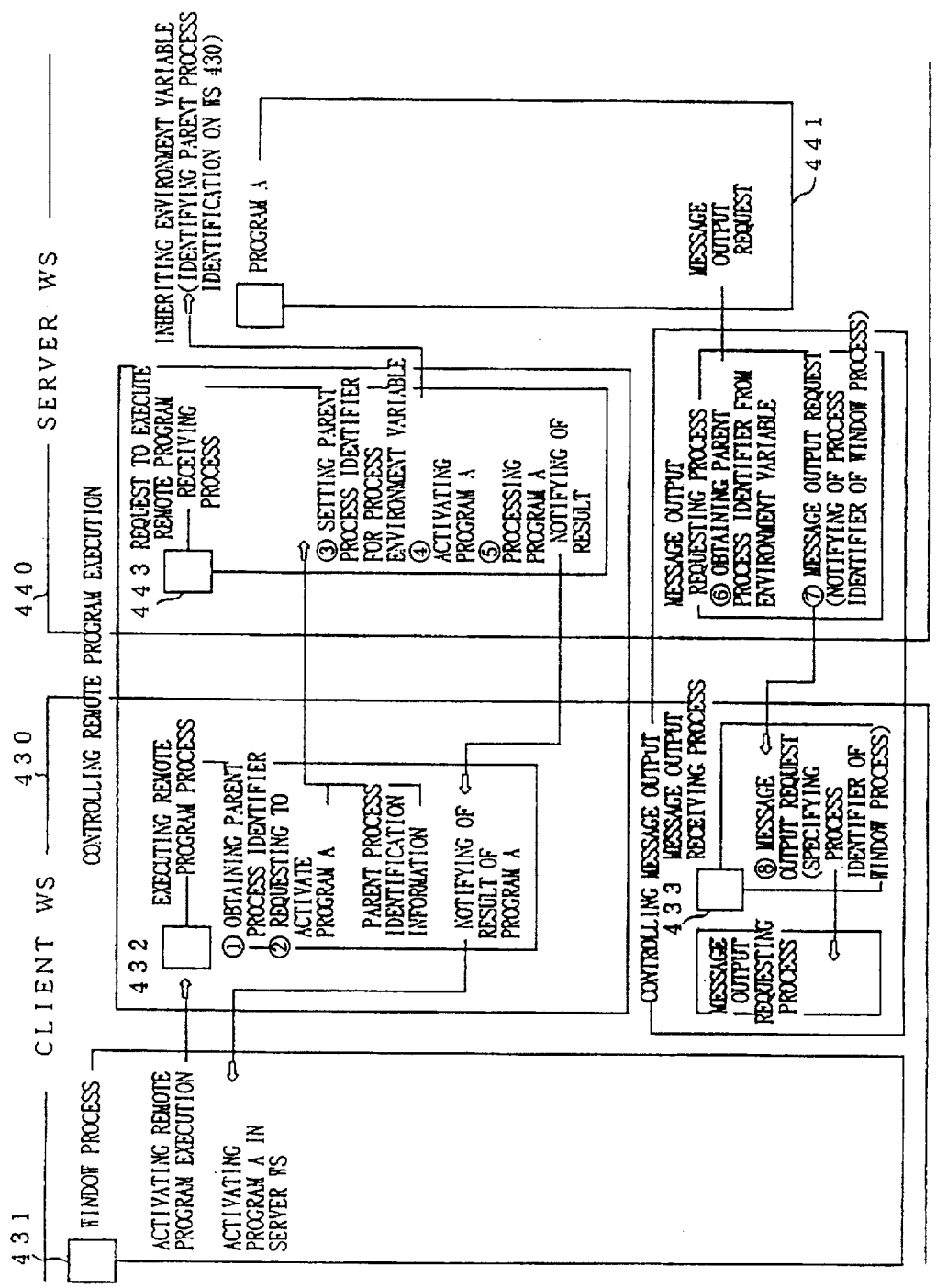
FIG. 17 shows a message control method for realizing the control of message display from a client work station to a window screen in executing a remote program shown in FIG. 16.

FIG. 17 shows a practical method of realizing the message display control.

First, as shown in FIG. 17, in a remote program execution control in which a target program in the server WS 440 through the window screen (window process) 431 in the client WS 430, the process identifier of window process 431 is transmitted to the target program by the control method according to the third embodiment.

That is, when window process 431 performs a remote program execution on program A 441 in the server WS 440, window process 431 generates remote program executing process 432 in the client WS 430. At this time, remote program executing process 432 obtains the identifier of its parent process, that is, the identifier of window process 431. Then, remote program executing process 432 transmits a request to execute program A 441 and the identifier of the parent process to remote program request receiving process 442 in the server WS 440 through the communication network.

On receiving them, remote program request receiving process 442 in the server WS 440 sets, for its own environment variable, the identifier of its parent process (identifier of window process 431) received from the client WS 430. Then, it activates program A 441. Thus, the child process of remote program request receiving process 442, that is, program 441, inherits the environment variable for which the identifier of its parent process is set.

Then, window process 431 in the client WS 430 is notified of the process result of program A 441 as in the above described third embodiment.

When program A 441 system-calls a message display request, a message display requesting process executed by the system call obtains according to an environment variable the identifier of the parent process set by remote program request receiving process 442 as described above. Then, predetermined contents of a message display is specified and a message display request is system-called.

A message display requesting program, specifically, a system program executed by a system call, determines whether or not the information on the identifier of a window process 431 exists in the environment variable of a message output requesting process (program A 441). If it does (yes), the process identifier of window process 431 is obtained, and message output receiving process 433 in the client WS 430 is notified of the process identifier through the communication network. Message output receiving process 433 specifies the process identifier of window process 431 as a message output unit identifier, and then system-calls a message output request on the window screen.

Figure 18:
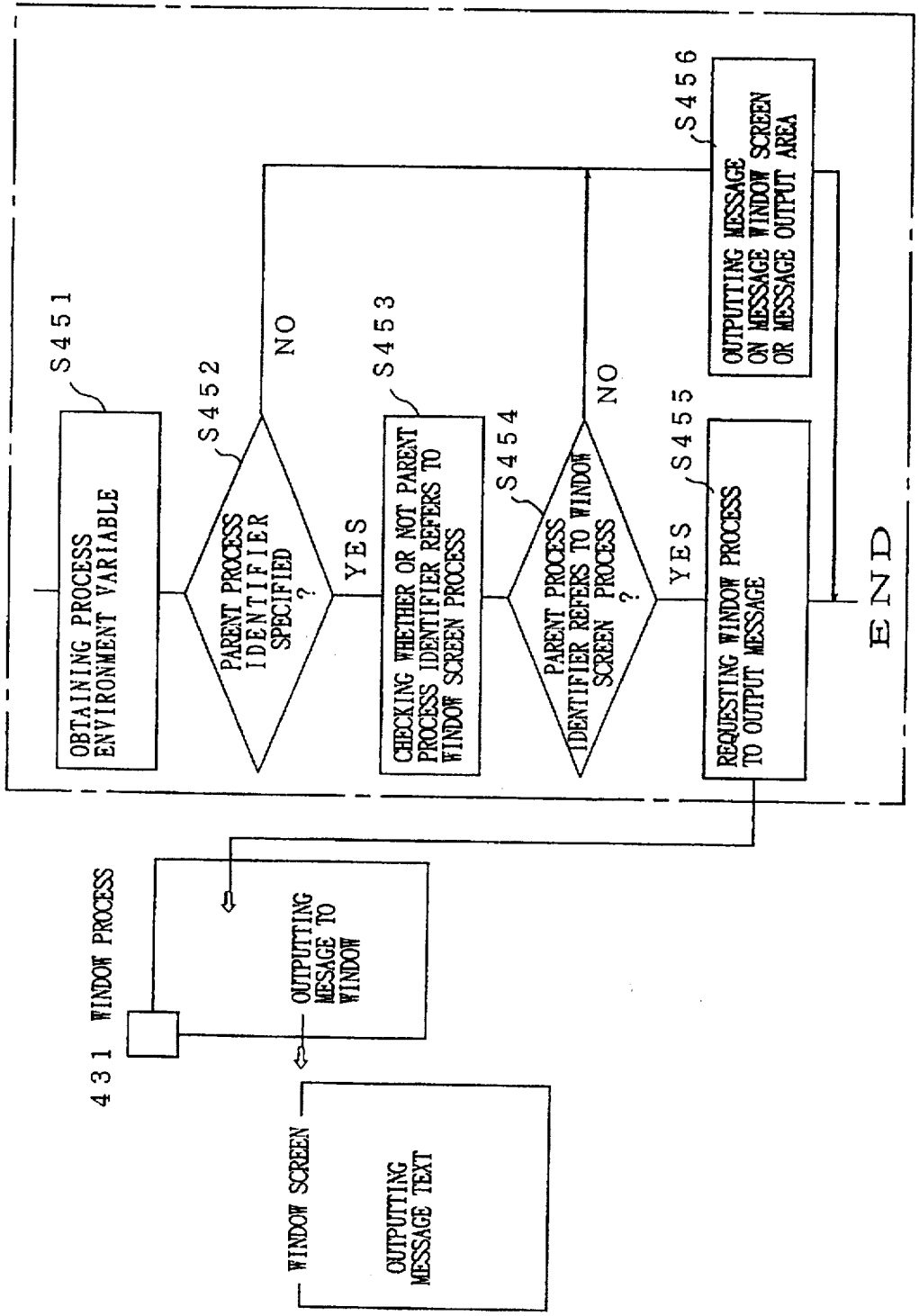
FIG. 18 is a flowchart for explaining the process of controlling a message to be outputted to a window.

FIG. 18 is a flowchart for explaining the message display requesting process performed by a system according to a system-call for a message display request.

In the process, a process environment variable is obtained first (S451). Then it is determined whether or not the environment variable contains a specified identifier of its parent process (S452). If it does (yes), it is determined whether or not the parent process identifier refers to window process 431 (S453 and S454). If it does (yes), a request is issued to display a message on window process 431 (S455). At the request, window process 431 operates such that a message is outputted (displayed) on the window screen.

On the other hand, if no parent process identifier can be found in the process environment variables ("No" in S452), or if the parent process identifier does not refer to window process 431 ("No" in S452), then a message is displayed on a predetermined message window screen or a message display area (S456)

Thus, when a program in any of other units is activated through a window screen by performing a remote program execution, a message outputted by the activated program can be displayed on the window screen through which a remote program execute command was entered. Thus, the operator can control a remote program in an interaction mode.

Figure 19:
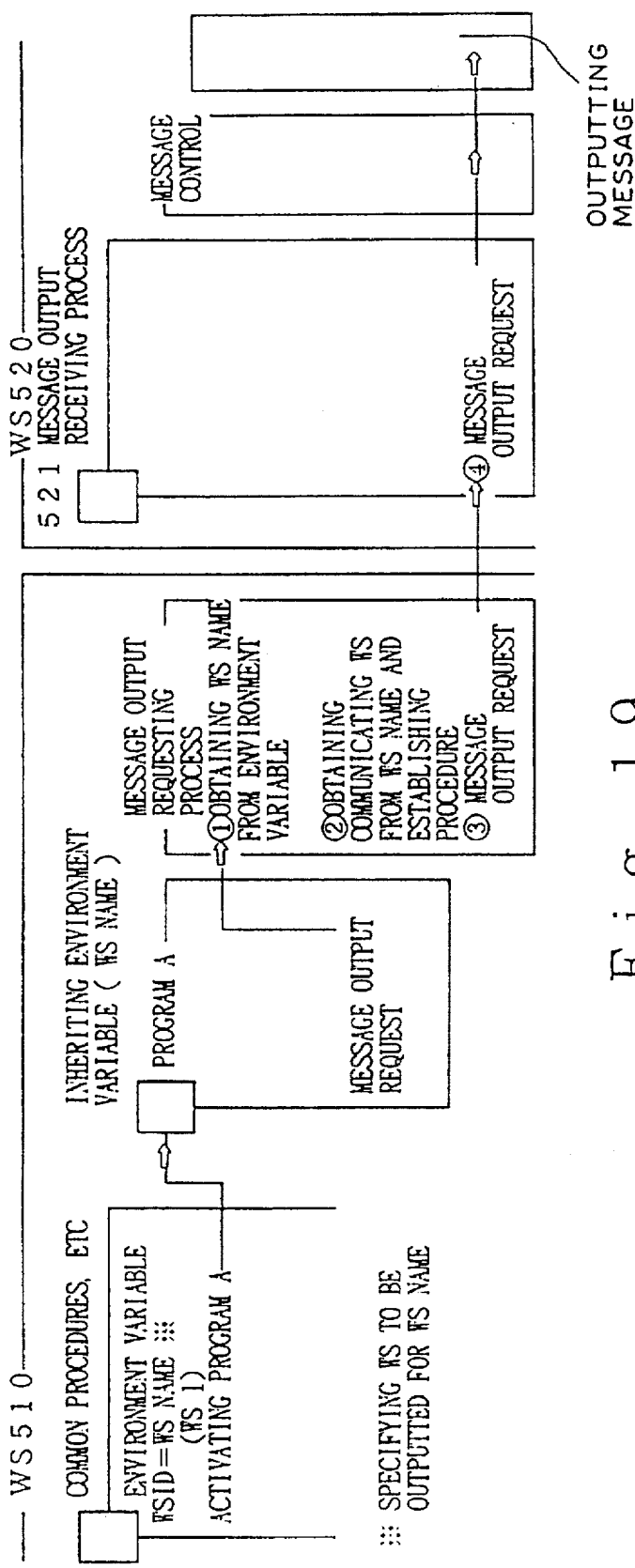
FIG. 19 shows a message control method of displaying a message on any work station.

Then, FIG. 19 shows an example of a message display control method according to which a message to be outputted by a program executed in the present unit is displayed on another WS.

FIG. 19 shows an example in which a message outputted by a program executed in WS 510 is displayed on WS 520.

To display a message as described above, the user sets in WS 510 the name of a WS on which he or she requests to output a message ("WSID" in the example shown in FIG. 19) as the environment information "WSID" indicating the identifier of a WS.

Then, program A is activated. If program A system-calls for a message display request, then the message display requesting process executed by the system-call first obtains the name of the WS ("WS 520") set according to the environment variable as described above.

Next, a WS to communicate with can be determined according to the obtained WS name, and a communications procedure is established between WS 510 and WS 520.

The message display request is received by message display receiving process 521 in the WS containing the above described message display unit. Thus, the message is displayed on the message display unit in WS 520.

Thus, an output message of a program executed in a unit can be easily displayed on any WS on which the message should be outputted by setting for an environment variable the name of a WS on which a user requests to display the message. Therefore, a message can be displayed on an appropriate unit depending on a job.

Figure 20:
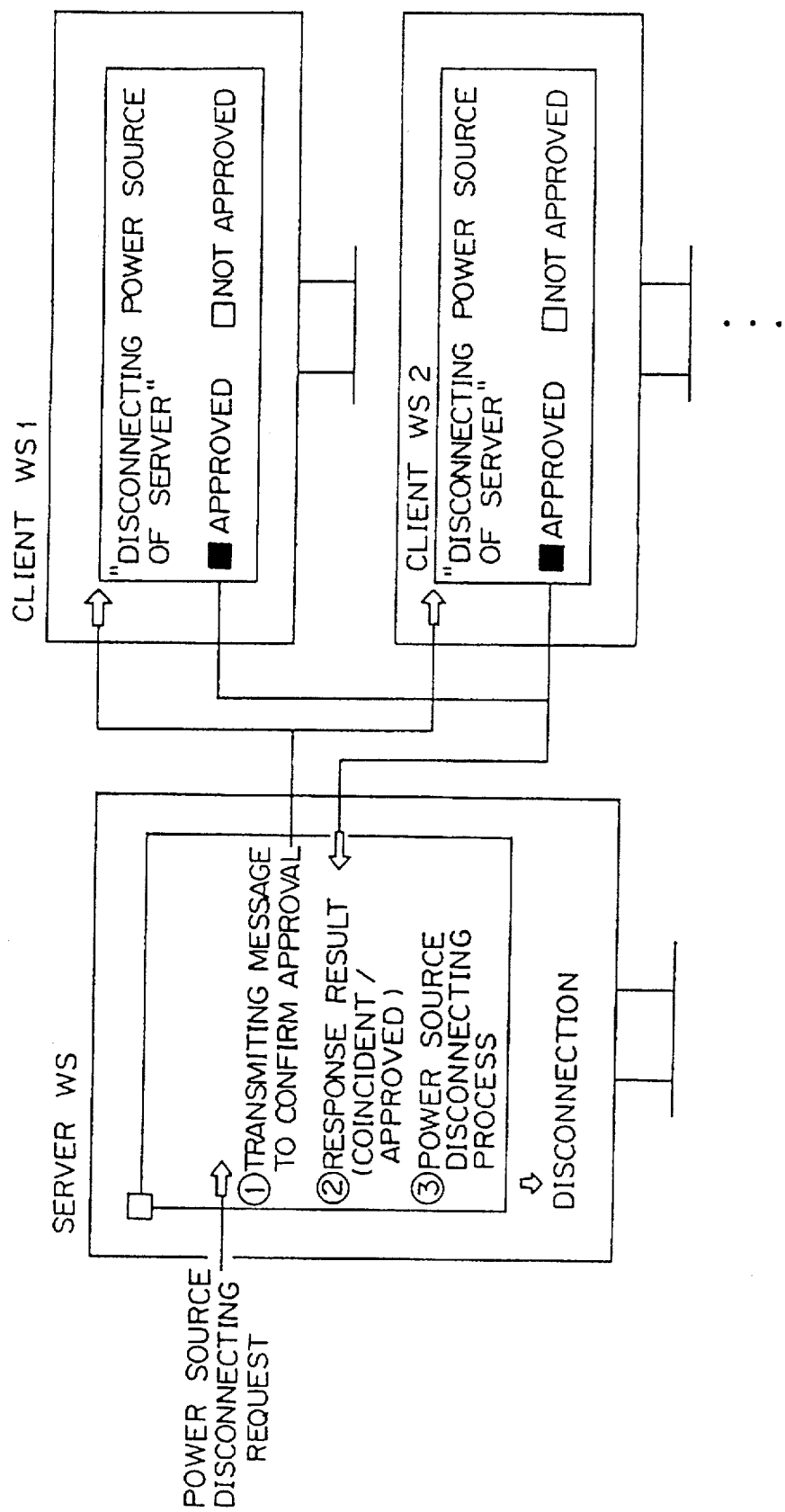
FIG. 20 shows a message control method in which a power disconnection permission is obtained from clients.

Next, explained below by referring to FIG. 20 is an example of, a server WS issuing a request to approve a power source disconnection to a client WS which is using the resources of the server WS when the server WS is disconnecting a power source, each client WS sending its approval of the disconnection of the power source. The example is indicated based on the above described second embodiment.

When a request to disconnect a power source has been issued, a server WS sends through the communication network a message "The server's power source is disconnected" to all clients WS 1, WS 2, . . . which are using its resources so as to obtain the acceptance of its request from each of them.

Then, the server waits for a response from each of the clients WS 1, WS 2, . . . which received the above described message. Assume that a client WS has no operator and cannot send back a response to the above described message. In this case, if a client does not send back its response within a predetermined monitoring time after the server WS has transmitted the above described message, then the unresponsive client WS is deleted from the WSs for receiving a message from the server. If there are no WSs for receiving a message, then the server WS recovers from the error that there are no message display units.

Figure 21:
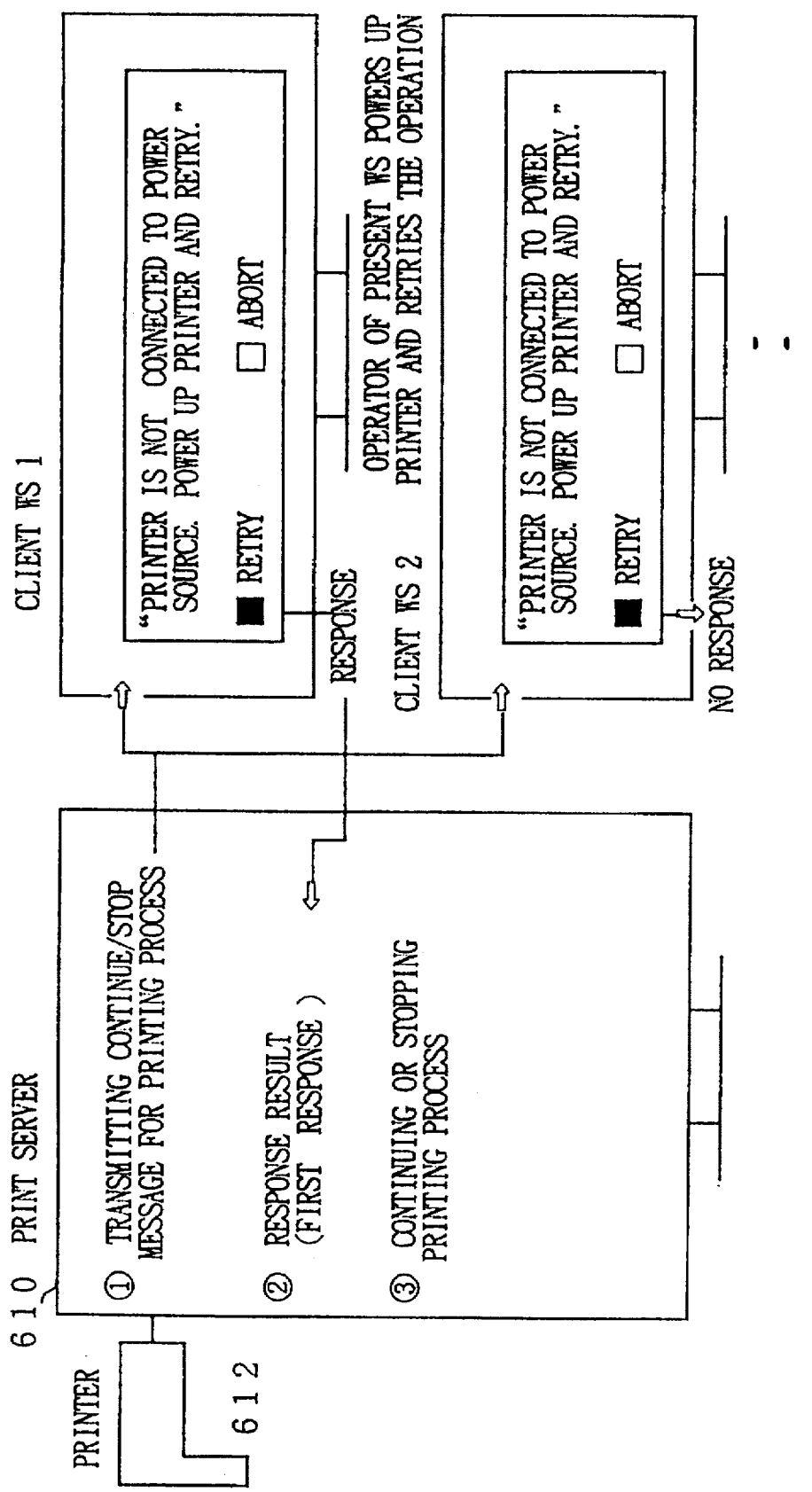
FIG. 21 shows a message control method in which a print server requests clients, each having an operator to power up its own printer.

FIG. 21 shows another application example of the second embodiment shown in FIG. 10. If a print server 610 has detected that the printer is not turned on when an execution result is being outputted on a printer 612 connected to the server, then it transmits a message such as "The printer is NOT turned on. Please retry after powering up the printer." to all clients WS 1, WS 2, . . . to have the message displayed on the display unit of each of the clients WS 1, WS 2, . . .

If the first response from any of the clients WS 1, WS 2, . . . indicates "retry", then the print server 610 confirms that the printer has been turned on, and continues the printing process. On the other hand, if the first response indicates "abort", the printing process is stopped. Thus, in the above described example, the print server 610 determines its process according to the first response from the operator of any of the clients WS 1, WS 2, . . .

As described above, the following effects can be obtained according to the present invention.

1. A message output unit is set for an environment variable pertaining to a process, and information on the message output unit identifier is obtained according to the environment variable so that a message can be outputted on the output unit when each process outputs a message. Therefore, in a system in which a child process activated by its parent process inherits an environment pertaining to its parent process, the message output unit can be easily changed by changing the environment of a parent process (for example, a command interpreter such as a UNIX shell) without changing an associated program at all.

Activating the child process transmits message output unit information from the parent process to the child process. Therefore, message output unit information can be easily notified from the parent process to the child process. Especially, when a parent process activates a plurality of child processes, the effect appears conspicuously.

2. If a plurality of message output units are set for an environment variable pertaining to a process and a message output request has been issued, then a plurality of message output unit identifiers are obtained from the environment variable, and a message is broadcasted to the message output units. When message output units receiving the message return a response, the information on the response result is notified to the message requesting unit. Therefore, the message can be broadcasted, and synchronous control of the system can be performed through waiting for response messages without establishing inter-process communications.

3. When an information processing unit activates (executes) a program in another information processing unit (target program), the message output unit given by the target program is notified from the activating information processing unit of the target program to the program-activated information processing unit. The message output unit is set for the environment information pertaining to the process in the program-activated information processing unit. The target program activated in the program-activated information processing unit obtains a message output unit identifier from the environment information, and the program-activated information processing unit outputs the output message of the target program to the requested unit. Accordingly, the activating information processing unit easily specifies the message output unit of the target program in the program-activated information processing unit, and easily specifies the message output unit to the subprogram (child process) activated by the target program.

What is claimed is:

1. A message control method for use in a system in which a plurality of information processing units are connected via communications lines so as to output messages from the information processing units to other information processing units, said method comprising the steps of:
   (a) setting, by one of the information processing units, a message output unit identifier in an environment variable pertaining to a process which requests another one of the information processing units to output a message; and
   (b) requesting a message output unit of the information processing units to output the message after obtaining the message output unit identifier from the environment variable when outputting the message.

2. A message control method for use in a system in which a plurality of information processing units are connected via communications lines so as to output to information processing units, messages requiring responses, said method comprising the steps of:
   (a) setting, by one of the information processing units, all message output unit identifiers in an environment variable pertaining to a process which requests another information processing unit to output a message requiring a response;
   (b) requesting message output units to output the message after obtaining the message output unit identifiers from the environment variable, when outputting the message requiring a response;
   (c) waiting for responses from the message output units; and
   (d) notifying a message requesting unit of a result of the responses received.

3. The message control method according to claim 2, further comprising the step of:
   (e) deleting a message output unit from response-waiting-object units if a respective one of the messaqe output units does not return a response within a time predetermined as a wait time for entering the response.

4. A message control method according to claim 2, wherein said waiting step (c) comprises the substep of:
   (c1) specifying one of waiting for a response from all message output units set according to the environment variable, and waiting for only a first response from the message output units set according to the environment variable.

5. The message control method according to claim 4, wherein said step d) of notifying the message requesting unit comprises the substeps of:
   (d1) determining whether all response results from all message output units match if said substep (c1) specifies waiting for responses from all the message output units, set according to the environment variable; and
   (d2) notifying the message requesting unit of the response results when all the response results match.

6. The message control method according to claim 4, wherein said substep (d2) of notifying the message requesting unit of the results in said substep (d1) comprises notifying the message requesting unit of a first response result if said substep (c1) specifies waiting for only the first response from the message output units set according to the environment variable.

7. A message control method for use in a system in which a plurality of information processing units are connected via communications lines, and the information processing units issue requests activating a program in another one of the information processing units, comprising the steps of:
   (a) transmitting data, pointing to a message output unit from an activating information processing unit which issues a request to activate, to a program-activated information processing unit which receives the request;
   (b) setting, in the program-activated information processing unit, a message output unit identifier transmitted from the activating information processing unit in a first respective environment variable pertaining to a process for activating the program according to the activation request; and
   (c) outputting a message to a message output unit after a process of the program activated by the process obtains the message output unit identifier according to a second respective environment variable.

8. The message control method according to claim 7, wherein the process of activating a program to be activated at the activation request by the program-activated information processing unit accepts the activation request from the activating information processing unit.

9. A message control method according to claim 7, wherein if a process of the program activated by the program-activated information processing unit further activates a process of a subprogram, the process of the subprogram obtains a message output unit identifier according to an environment variable inherited from the process which activated the subprogram, and outputs a message to the message output unit.

10. A message control method for use in a system in which a plurality of information processing units are connected via communications lines and an activating requesting information processing unit of one of the plurality of information processing units issues an activation request to activate a program in another one of the information processing units, comprising the steps of:
   (a) transmitting, by the activating requesting information processing unit which issues the activation request, an identifier of the activation requesting information processing unit to a program-activated information processing unit of the plurality of information units;
   (b) setting, by a process of activating the program to be activated in response to the activation request in the program-activated information processing unit, the identifier of the activating information processing unit in an environment variable pertaining to the process; and
   (c) obtaining, by a process of the program activated by the process, the identifier of the activating requesting information processing unit according to its own environment variable, and outputting a message to the activating requesting information processing unit.

11. A message control method according to claim 10, wherein in said step (b) the activating requesting information processing unit can activate a program from another one of the information processing unit units, through a window.

12. A message control system for use in a system in which a plurality of information processing units are connected via communications lines, comprising:
   means for setting a message output unit identifier in an environment variable pertaining to a process; and
   means for obtaining said message output unit identifier from the environment variable set by said setting means, and generating a process of outputting said message to said message output unit.

13. A message control system for use in a system in which a plurality of information processing units are connected via communications lines, comprising:

means for setting all message output unit identifiers, to which a message requiring a response is outputted, in an environment variable pertaining to a process;

means for obtaining said all message output unit identifiers from the environment variable set by said setting means, and generating a process of outputting said message requiring the response to said message output unit identifiers; and means for notifying said process of the information on response results after receiving responses from said all message output unit identifiers.

14. A message control system for use in a system in which a plurality of information processing units are connected via communications lines, comprising:

a first information processing unit having a program stored therein;

a second information processing unit comprising:
means for transmitting, via communication lines, message output unit information on a program and a remote program activation request to activate said program in said first information processing unit, said remote program activation request being issued by a process; and a third information processing unit comprising:
means for receiving, via said communication lines, said remote program activation request and said message output unit information, setting said message output unit information, setting said message output unit information for an environment variable pertaining to a process, and generating a process of activating a program specified by said remote program activation request;

means for having a child process, activated by a parent process, inherent in a parent environment variable of said parent process; and means for generating a subprocess for outputting a message according to the message output unit information set for the environment variable in response to an activation request from said parent process.

15. A message control method for use in a system in which a plurality of information processing units are connected via communication lines, and the information processing units issue requests activating a program in another one of the information processing units, comprising the steps of:

(a) transmitting a request to activate a program from an activating information processing unit to a program-activated information processing unit, the request designating a first process issuing the request as a message output identifier;

(b) setting, in the program-activated information processing unit, the message output identifier transmitted from the activating information processing unit in an environment variable pertaining to a second process for activating the program according to the request transmitted in step (a):

(c) transmitting a message from the program-activated information processing unit to the activating information processing unit after the second process obtains the message output identifier from the environment variable; and (d) displaying the message on a display area controlled by the first process.

* * * * *